(12) United States Patent
Kertesz et al.

(10) Patent No.: US 7,562,910 B2
(45) Date of Patent: Jul. 21, 2009

(54) PLUG-TYPE CONNECTION ARRANGEMENT FOR A HOSE AND A PIPE

(75) Inventors: Janos Kertesz, Hofheim (DE); Gerhard Wachter, Büdingen (DE)

(73) Assignee: NORMA Germany GmbH, Maintal (DE)

( * ) Notice: Subject to any disclaimer, the term of this patent is extended or adjusted under 35 U.S.C. 154(b) by 90 days.

(21) Appl. No.: 11/973,943

(22) Filed: Oct. 10, 2007

(65) Prior Publication Data

US 2008/0084061 A1   Apr. 10, 2008

(30) Foreign Application Priority Data

Oct. 10, 2006   (DE)   ................ 10 2006 047 882

(51) Int. Cl.
*F16L 33/00* (2006.01)

(52) U.S. Cl. .................. 285/256; 285/305; 285/921

(58) Field of Classification Search .............. 285/256, 285/258, 257, 305, 921
See application file for complete search history.

(56) References Cited

U.S. PATENT DOCUMENTS

| | | | | |
|---|---|---|---|---|
| 2,825,588 A | * | 3/1958 | Howard | 285/258 |
| 4,969,667 A | * | 11/1990 | Sauer | 285/256 |
| 4,969,669 A | * | 11/1990 | Sauer | 285/256 |
| 5,040,829 A | * | 8/1991 | Sauer | 285/256 |
| 5,044,675 A | * | 9/1991 | Sauer | 285/256 |
| 5,080,404 A | * | 1/1992 | Sauer | 285/256 |
| 5,082,315 A | * | 1/1992 | Sauer | 285/256 |
| 5,094,493 A | * | 3/1992 | Sauer | 285/256 |
| 5,209,527 A | * | 5/1993 | Hohmann et al. | 285/258 |
| 5,273,323 A | * | 12/1993 | Calmettes et al. | 285/256 |
| 5,314,210 A | * | 5/1994 | Calmettes et al. | 285/256 |
| 5,536,047 A | * | 7/1996 | Detable et al. | 285/921 |
| 5,988,704 A | * | 11/1999 | Ryhman | 285/256 |
| 6,481,758 B1 | * | 11/2002 | Andre et al. | 285/256 |
| 6,540,262 B1 | * | 4/2003 | Humphreys | 285/256 |
| 7,108,292 B2 | * | 9/2006 | Lipscomb et al. | 285/256 |
| 7,469,937 B2 | * | 12/2008 | Iturgoyen Sabando et al. | 285/305 |

FOREIGN PATENT DOCUMENTS

DE    38 13 192    11/1989

(Continued)

*Primary Examiner*—David E Bochna
(74) *Attorney, Agent, or Firm*—Friedrich Kueffner

(57) ABSTRACT

A plug-type connection arrangement for a hose and a pipe, the connection arrangement comprising a sleeve having an outer wall and an inner wall, wherein the hose is insertable from an end of the sleeve and is clampable in the sleeve, wherein the sleeve has at another end thereof a first annular groove with an open resilient connecting ring which extends over more than 180° and is lockable to the sleeve and the pipe, and a sealing ring for sealing the sleeve relative to the pipe in a connected state of the pipe and the hose, the connecting ring being comprised of a plate spring ring with inwardly directed flanges at both circumferential edges thereof, wherein the flanges of one circumferential edge are engageble in the first annular groove and the flanges of the other circumferential edge are engageable behind a holding rib on the pipe, wherein the sealing ring is mounted in a second annular groove formed by the inner wall of the sleeve and the axially inner wall of the first annular groove, and wherein an end portion of the pipe is insertable into the sleeve.

12 Claims, 3 Drawing Sheets

FOREIGN PATENT DOCUMENTS

| | | |
|---|---|---|
| DE | 39 14 645 | 11/1989 |
| DE | 38 15 172 | 3/1990 |
| DE | 197 40 649 | 3/1999 |
| DE | 198 18 562 | 2/2000 |
| DE | 197 40 649 | 2/2004 |
| DE | 102004019799 | 11/2005 |
| EP | 1 681 504 | 7/2006 |

* cited by examiner

PLUG-TYPE CONNECTION ARRANGEMENT FOR A HOSE AND A PIPE

BACKGROUND OF THE INVENTION

1. Field of the Invention

The present invention relates to a plug-type connection arrangement for a hose and a pipe. The arrangement includes a sleeve having an outer wall and an inner wall between which the hose can be inserted and clamped from one end of the sleeve. The arrangement has at the other end of the sleeve a first annular groove with an open resilient connecting ring which extends over more than 180° and can be locked with the sleeve as well as with the pipe, and a sealing ring for sealing the sleeve relative to the pipe in the connected state of the pipe and the hose.

2. Description of the Related Art

An arrangement of the above-described type is known from DE 197 40 649 B4. In this arrangement, the connecting ring is of spring steel wire. The legs of the ring are pushed tangentially through circumferential slots of the pipe and in the outer wall of the sleeve located one above the other, wherein the pipe has been pushed onto the outside of the sleeve in the outer wall of the sleeve. The edges of the outer slots are forced outwardly and the edges of the inner slots are forced outwardly and inwardly. This results in projections which form axially acting abutments for the legs of the connecting ring for holding together the pipe and the sleeve. The spring steel wire has a round cross section. Consequently, the legs of the connecting ring can be pressed radially outwardly when a high axial load acts on the connection until the legs are forced over the outwardly pressed edges of the slots, so that the connection is separated. Since the legs of these edges also apply a point-like load, there is the danger that the edges are deformed under the pressure of the legs.

For separating the connection by radially pulling off the connecting ring, the connecting ring is in actual practice provided in its upper transverse portion between the legs with a protrusion which projects in a locking manner radially beyond the circumference of the pipe, wherein the protrusion is intended to be engaged by a tool or by hand.

The sealing ring is seated in the first annular groove between the annular groove and the pipe. Dirt may penetrate through the slots in the pipe which may contaminate the sealing ring if the connection is separated several times and the connection is once again coupled, so that the sealing ring is no longer providing a tight seal.

SUMMARY OF THE INVENTION

Therefore, is the primary object of the present invention to provide a plug-type connection arrangement of the above-described type which is capable of withstanding a higher axial load and which has a more compact construction.

In accordance with the present invention, this object is met by the fact that the connecting ring is a plate spring ring with inwardly directed flanges at its two circumferential edges, the flanges of a first circumferential edge are placeable in the first annular groove and the flanges of the other circumferential edge are placeable behind a holding rib at the pipe, the sealing ring is arranged in a second annular groove which is defined by the inner wall of the sleeve and the axially inner wall of the first annular groove, and an end section of the pipe can be inserted into the sleeve.

As a result of the configuration according to the present invention, the locking projection at the connecting ring is no longer present. In order to separate the connection, spreading pliers can be placed between the circumferential ends of the connecting ring or in holes at these ends. The connecting ring may be made of a very bending-resistant spring steel so that its flanges are not bent axially to the outside and the connection remains maintained even if a high axial load acts on the connection. The flanges can be supported by the first annular groove of a large circumferential section of the first annular groove while axially subjecting the connection to a load, so that no point-like load occurs with the correspondingly high surface pressure. In accordance with a preferred feature, the flanges rest over large surface areas thereof against the axially outer wall of the first annular groove.

The lock-type connection arrangement according to the present invention prevents dirt from entering from the inside at the sealing ring, since the sealing ring is located within the sleeve. Consequently, its sealing capacity remains for a longer time.

Moreover, at least one of the sleeve walls may be of sheet metal which is permanently deformable radially in the direction toward the hose. The deformation can be carried out after the hose has been inserted into the sleeve, so that the hose is fixedly clamped within the sleeve.

In accordance with a preferred feature, the first annular groove is formed with a double wall of permanently deformable sheet metal of the sleeve. As a result, the wall of the first annular groove, which is subjected to a load by the flanges of the connecting ring when an axial load is placed on the connection, has a high bending stiffness without being bent when there is a high axial load.

Moreover, the outer wall of the sleeve may have at least one inwardly projecting protrusion for the engagement in the hose material. This protrusion contributes additionally to the axial support of the hose of the sleeve.

In this connection, the outer wall of the sleeve may have permanently deformable sheet metal which has a slot for each protrusion of the outer wall, wherein each slot extends in the circumferential direction of the sleeve, wherein the rim of the slot faces away from the hose end inserted into the sleeve and wherein the rims is pressed inwardly as a protrusion of the outer wall. A protrusion constructed in this manner penetrates more easily and deeper into the hose material in the manner of a barbed hook when the connection is subjected to axial load.

It is preferably ensured that the inner wall of the sleeve has synthetic material and is connected in a positively engaging manner with the outer wall of the sleeve. This configuration of the sleeve simplifies the desired shaping of the sleeve walls. Thus, the inner wall of the sleeve can be provided with fir tree-like outer ribs in order to increase the support of the hose in the sleeve.

Moreover, the synthetic material of the inner wall of the sleeve may be a thermoplastic material and the inner wall may form the bottom and the axially inner wall of the second annular groove. This makes it possible to construct the sealing ring as a lip seal which includes a first elastomer and is injection molded onto the synthetic material of the inner wall of the sleeve in the second annular groove. If the sealing ring and the type of its fastening in the second annular groove is configured in this manner, a separate assembly of the sealing ring is not necessary. Moreover, the sealing ring provides a high sealing effect.

Alternatively, the outer wall of the sleeve may comprise synthetic material and the inner wall of the sleeve may comprise permanently deformable sheet metal and may be connected in a positively engaging manner with the outer wall.

The sleeve and the first annular groove may be constructed as a single piece of a permanently deformable sheet metal. In that case, the first annular groove has a double wall and is mote bending stiff as a result.

The positively engaging connection of the sleeve walls may be a locking plug-type connection. This makes it simpler to construct the connection.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

DETAILED DESCRIPTION OF THE INVENTION

Figure 1:
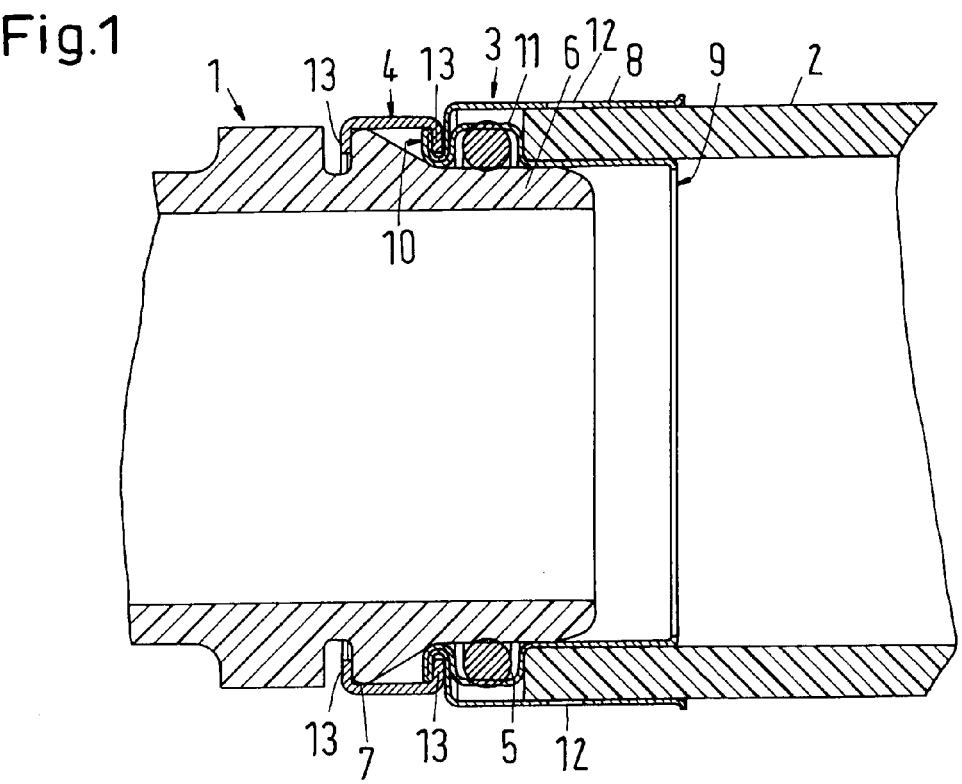
FIG. 1 is an axial sectional view of a first embodiment of a plug-type connection arrangement according to the invention for connecting a pipe to a hose.
Figure 2:
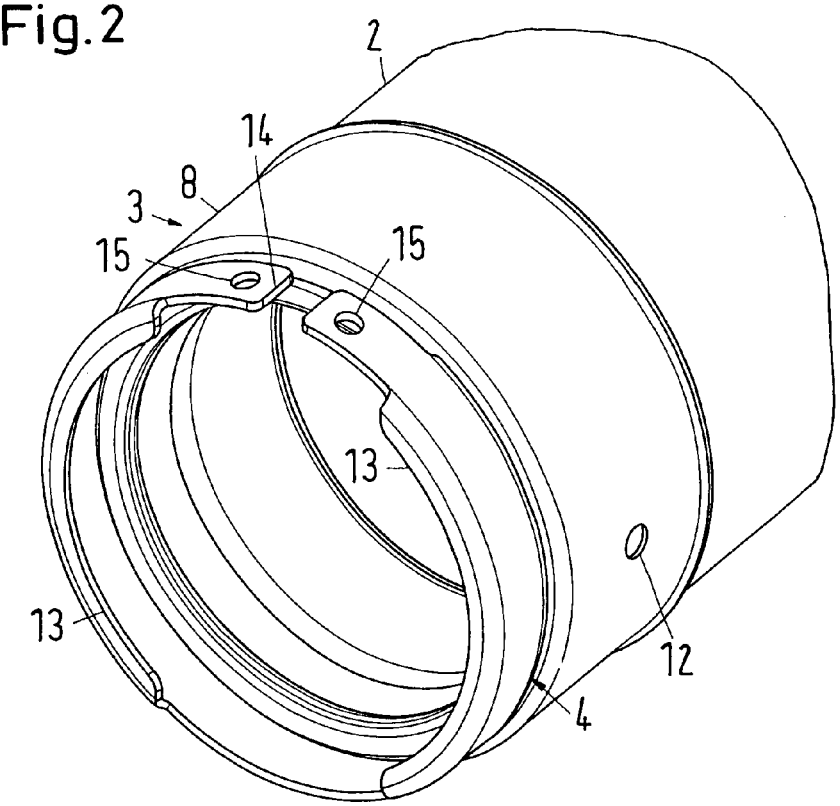
FIG. 2 is a perspective view of a portion of the plug-type connection arrangement according to FIG. 1, shown without the pipe.

The first embodiment of a plug-type connection arrangement according to the present invention as shown in FIGS. 1 and 2 is composed of a pipe 1, a hose 2, a sleeve 3, a connecting ring 4, and a sealing ring 5. The pipe 1 may also be a pipe connection piece. The sealing ring 5 may be an O-ring.

The pipe 1 has thermoplastic synthetic material, for example, PA, POM, PBT or PBN, however, the pipe 1 may also contain metal.

The hose 2 also has synthetic material, for example, an elastomer, however, the hose 2 may also have rubber.

The sleeve 3 is composed of a permanently deformable sheet metal, preferably aluminum or steel.

The connecting ring 4 is of spring steel.

The sealing ring 5 also is composed of an elastomer or rubber. The pipe 1 has an end portion 6 with a circumferential holding rib 7 which includes an inclined contact surface and defines an annular groove. When the connection between the pipe 1 and the hose 2 is effected, the end portion 6 is inserted into an end portion of the sleeve 3.

The sleeve 3 is formed in a single piece with an outer wall 8 and an inner wall 9, wherein the outer and inner walls are spaced apart radially from each other in an end portion on the side of the hose. An end portion of the hose 2 is inserted into the sleeve 3 between the outer wall 8 and the inner wall 9 and is clamped by a permanent deformation, not shown, of the outer wall 8 and/or the inner wall 9 in the sleeve 3. The deformation may be composed of at least 1 corrugation which extends in the circumferential direction of the sleeve 3.

The end portion of the sleeve 3 on the side of the pipe forms a radially outwardly open first annular groove 10 which has a double wall and is correspondingly bending stiff, and a second annular groove 11 which is adjacent the first annular groove 10 and is open radially inwardly and receives the sealing ring 5, so that the sealing ring 5 seals the sleeve 3 on its inner side and the end portion 6 of the pipe 1 inserted into the sleeve 3 on the outer side thereof.

The outer wall 8 of the sleeve 3 additionally has openings 12, so that it can be visually checked whether the hose 2 has been sufficiently deeply inserted into the sleeve 3 before it is clamped tight in the sleeve 3.

The connecting ring 3 has radially inwardly protruding flanges 13 at each of its axial edges. The flanges 13 on the side of the hose have already been engaged in the annular groove 10 before the insertion of the end portion 6 of the pipe 1 into the sleeve 3. At this time, the connecting ring 4 provided with an axial slot 14 shown in FIG. 2 is expanded by means of spreading pliers placed in the slot 14 or in holes 15 formed near the edges of the slot 14; the connecting ring 4 is then placed in the annular groove 10 and the connecting ring 4 is untensioned.

In order to be able to expand the connecting ring 4, gaps are formed between the flanges 13 diametrically opposite the slot 14, as shown in FIG. 2. The flanges 13 on the side of the hose rest over the entire circumferential length thereof at least at the axially outer inner side of the annular groove 10 over a large surface area thereof, preferably against both inner sides of the annular groove 10, as illustrated in FIG. 1. The contact over a large surface area results in a low surface pressure when an axial load is applied to the connection.

After the connecting ring 4 has been preassembled on the sleeve 3, the end portions 6 of the pipe 1 is inserted into the sleeve 3, wherein the flanges 13 located on the insertion side slide over an inclined contact surface of the holding rib 7 so as to widen the connecting ring 4 and engage in the annular groove 8. Since the flanges 13 on the side of the hose essentially fill out the annular groove 10, it is practically impossible that the connecting ring 4 is axially displaced when the pipe 1 is coupled.

Alternatively, the flanges 13 may also be slightly inclined relative to the axial center of the connecting ring 4. In that case, the flanges 13 are somewhat more bending stiff against an axial load applied to the connection and, when the connecting ring 4 is mounted or the pipe 1 is coupled, the flanges slide more easily over the edge of the annular groove 10 on the side of the end face or over the holding rib 7. However, in many types of load applications, the contact between the radially inner edges of the flanges 13 and the respective sides of the annular grooves 8 or 10, which is now only linear, may be sufficient to prevent a deformation of these sides.

Figure 3:
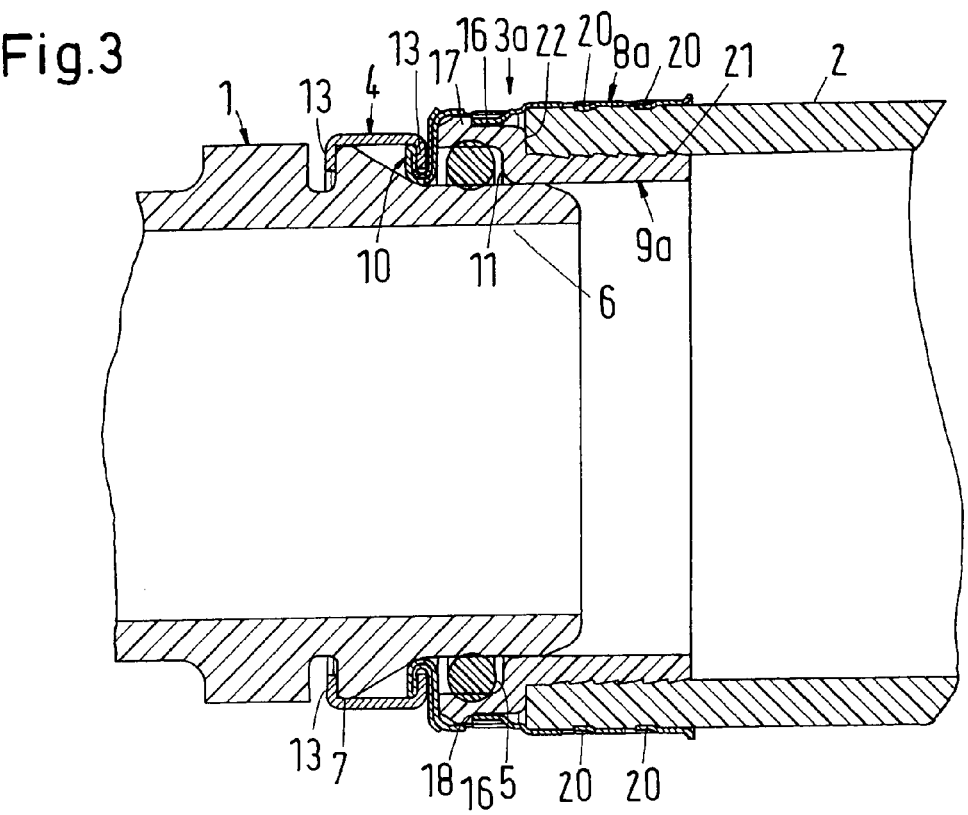
FIG. 3 is an axially sectional view of a second embodiment of a plug-type connection arrangement according to the present invention, wherein, compared to the arrangement according to FIG. 1, some modifications have been carried out.
Figure 4:
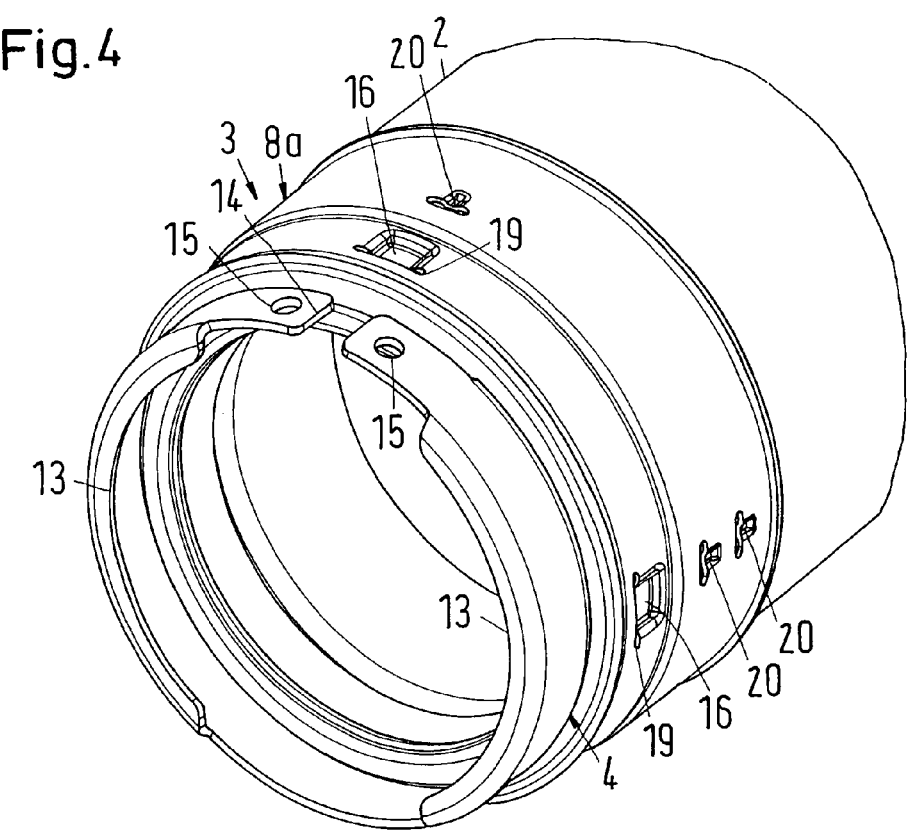
FIG. 4 is a perspective view of the arrangement of FIG. 3, shown without the pipe.

The embodiment according to FIGS. 3 and 4, to the extent that the same reference numerals are used for components as in FIGS. 1 and 2, is identical to the embodiment shown in FIGS. 1 and 2. However, those components which are modified as compared to those of FIGS. 1 and 2 are provided with the index "a".

Accordingly, only the sleeve 3a is different as compared to the first embodiment. The outer wall 8a of the sleeve 3a has permanently deformable sheet metal and is manufactured separately from the inner wall 9a which has thermoplastic material and is connected to the inner wall 9a by means of a positively engaging connection. This positively engaging connection is a lockable plug-type connection. The connection resides in that the outer wall 8a is provided with four inwardly pressed protrusions 16 which are arranged uniformly distributed over a circle around the outer wall 8a, and that the inner wall 9a has a circumferential holding rib 17 which engages behind the protrusions 16 when the hose 2 is inserted into the sleeve 3a. The holding rib 17 is provided at the end face thereof with an inclined contact surface. In the same manner, the protrusions 16 are on the back side thereof provided with inclined contact surfaces. The inclined contact surfaces facilitate plugging together the inner wall 9a and the outer wall 8a because the protrusion 16 and the holding rib 17 can be moved past each other more easily.

The protrusions 16 are formed by radially pressing in an edge 18 circumferentially extending short slots as shown in FIG. 4.

The outer wall 8a has additional inwardly pressed protrusions 20 which are uniformly distributed over the circumference of the holding rib 3a and are constructed exactly like the protrusions 16, however, somewhat smaller than the protrusions 16. Several protrusions are arranged one behind the other. Moreover, the outer wall 8a and the outer wall 8 of the first embodiment form the double-wall annular groove 10.

The inner wall 9a is on its outer side ribbed like a fir tree, i.e., the inner wall 9a is provided with ribs 21 which extend parallel to each other, wherein the inner wall 9a forms with a step-like projection 22 one side and the bottom of the second annular groove 11. The other side of the annular groove 11 is defined by the double-wall part of the first annular groove 10 or of the outer wall 8a.

When the hose 2 is inserted into the sleeve 3a between the outer wall 8a and the inner wall 9a, the protrusions 20 and the ribs 21 engage into the hose material, so that the hose 2 is firmly held in the sleeve 3a. In addition, the outer wall 8 may be provided with radially inwardly pressed deformations, for example, corrugations, so that the hose 2 is even more firmly held in the sleeve 3a and the connection is capable of withstanding an even higher axial load. Depending on the magnitude of the axial load acting on the connection, a smaller or greater number of protrusions 16 and 20 may be provided. In the case of a low axial load, a single rib 21 and/or only a single protrusion 20 may be sufficient, particularly if the outer wall 8a is inwardly deformed, for example, provided with corrugations.

Figure 5:
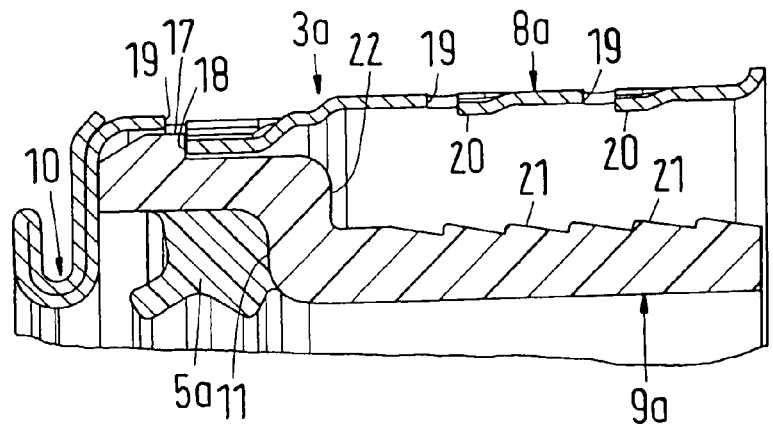
FIG. 5 is an enlarged sectional portion of the axial sectional view of the arrangement of FIG. 3, including a lip seal instead of the O-ring shown in FIG. 3.

The embodiment of the plug-type connection arrangement according to the present invention illustrated in FIG. 5 only as an enlarged detail differs from the embodiment in FIGS. 3 and 4 only with respect to the sealing ring 5a which is injection molded into the annular groove 11 in the form of a lip seal of an elastic synthetic material before the inner wall 9a is inserted into the outer wall 8a. The sealing ring 5a has a better sealing effect than the O-ring 5 and does not have to be separately mounted.

Figure 6:
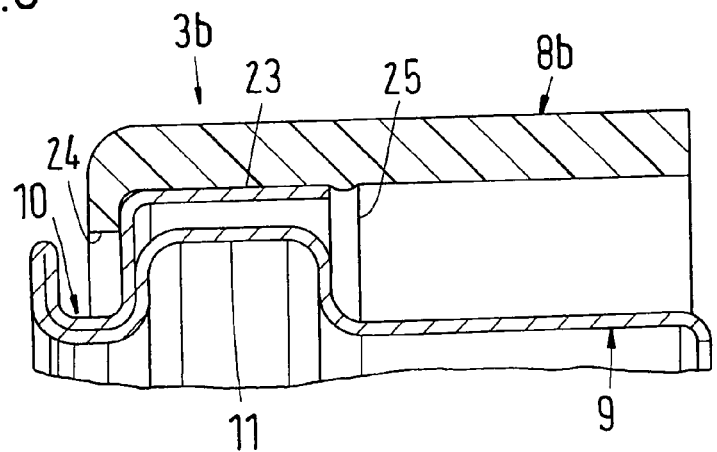
FIG. 6 is an enlarged portion of an axial sectional view of a third embodiment of the arrangement of the invention, wherein the arrangement is modified as compared to FIG. 1.

The embodiment of the plug-type connection arrangement according to the present invention illustrated in FIG. 6 as an enlarged detail differs from the embodiment shown in FIGS. 1 and 2 essentially only in that the outer wall 8b of the sleeve 3b has synthetic material and that the outer wall 8b can be engaged between two inwardly protruding protrusions 24 and 25 of the outer wall 8b formed by a backwardly bent portion 23 so that a positively engaging plug-type connection is obtained between the outer wall 8b and the inner wall 9. In order to clamp the hose 2 between the outer walls 8b and the inner wall, only the inner wall 9 which continues to contain permanently deformable sheet metal is deformed, for example, also by means of corrugations which extend in the circumferential direction of the inner wall 9 and are radially outwardly pressed in the inner wall 9, wherein the corrugations engage into the hose material.

Figure 7:
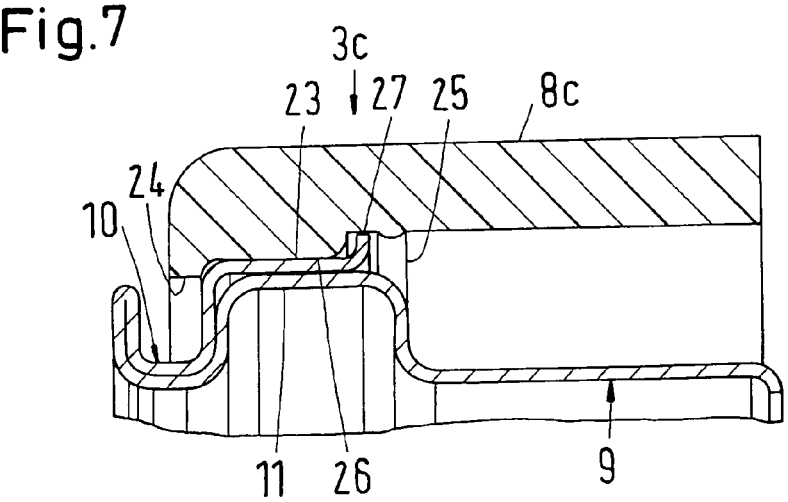
FIG. 7 is an enlarged portion of an axial sectional view of a fourth embodiment of the arrangement according to the present invention, wherein some modifications have been made as compared to the embodiment of FIG. 1.

The embodiment of the plug-type connection arrangement according to the present invention illustrated in FIG. 7 also only as an enlarged detail differs from the embodiment illustrated in FIG. 6 only in that the outer wall 8c has on the inside thereof an additional step 26 and the part 23 of the inner wall 9 is provided with a radially outwardly projecting flange 27 which, when the outer wall 8c and the inner wall 9 are pushed together, is locked between the step 26 and the protrusion 25. The part 23 is supported at the bottom of the annular groove 11. Accordingly, the flange 27 can withstand a higher axial load acting on the connection without disengaging from the groove between the step 26 and the protrusion 25.

While specific embodiments of the invention have been shown and described in detail to illustrate the inventive principles, it will be understood that the invention may be embodied otherwise without departing from such principles.

We claim:

1. A plug-type connection arrangement for a hose and a pipe, the connection arrangement comprising a sleeve having an outer wall and an inner wall, wherein the hose is insertable from an end of the sleeve and is clampable in the sleeve, wherein the sleeve has at another end thereof a first annular groove with an open resilient connecting ring which extends over more than 180° and is lockable to the sleeve and the pipe, and a sealing ring for sealing the sleeve relative to the pipe in a connected state of the pipe and the hose, the connecting ring being comprised of a plate spring ring with inwardly directed flanges at both circumferential edges thereof, wherein the flanges of one circumferential edge are engageble in the first annular groove and the flanges of the other circumferential edge are engageable behind a holding rib on the pipe, wherein the sealing ring is mounted in a second annular groove formed by the inner wall of the sleeve and the axially inner wall of the first annular groove, and wherein an end portion of the pipe is insertable into the sleeve.

2. The plug-type connection arrangement according to claim 1, wherein at least one of the sleeve walls comprises sheet metal which is permanently deformable in a direction toward the hose.

3. The plug-type connection arrangement according to claim 1, wherein the first annular groove is formed by two walls of permanently deformable sheet metal of the sleeve.

4. The plug-type connection arrangement according to claim 1, wherein the outer wall of the sleeve has at least one inwardly protruding protrusion for engagement in the hose material.

5. The plug-type connection arrangement according to claim 4, wherein the outer wall of the sleeve comprises permanently deformable sheet metal having for each protrusion of the outer wall a slot extending in the circumferential direction of the sleeve, wherein an edge of the slot facing away from the hose end inserted into the sleeve is pressed inwardly as a projection of the outer wall.

6. The plug-type connection arrangement according to claim 5, wherein the inner wall of the sleeve is comprised of synthetic material and is in a positively engaging manner connected to the outer wall of the sleeve.

7. The plug-type connection arrangement according to claim 6, wherein the inner wall of the sleeve has ribs shaped on the outside thereof shaped like a fir tree.

8. The plug-type connection arrangement according to claim 6, wherein the synthetic material of the inner wall of the sleeve is thermoplastic and the inner wall forms a bottom and the axially inner wall of the second annular groove.

9. The plug-type connection arrangement according to claim 8, wherein the sealing ring is comprised of a lip seal which comprises an elastomer and is injection molded in the second annular groove to the synthetic material of the inner wall of the sleeve.

10. The plug-type connection arrangement according to claim 1, wherein the outer wall of the sleeve is comprised of synthetic material and the inner wall of the sleeve has permanently deformable sheet metal and is connected in a positively engaging manner with the outer wall.

11. The plug-type connection arrangement according to claim 2, wherein the sleeve and the first annular groove are integrally formed as one piece.

12. The plug-type connection arrangement according to claim 6, wherein the positively engaging connection between the housing walls is a locked plug-type connection.

* * * * *